(12) United States Patent
Zhen et al.

(10) Patent No.: US 10,972,672 B2
(45) Date of Patent: Apr. 6, 2021

(54) DEVICE HAVING CAMERAS WITH DIFFERENT FOCAL LENGTHS AND A METHOD OF IMPLEMENTING CAMERAS WITH DIFFERENT FOCAL LENGTHS

(71) Applicants: Ruiwen Zhen, Allen, TX (US); John W. Glotzbach, Allen, TX (US); Raja Bala, Pittsford, NY (US); Hamid Rahim Sheikh, Allen, TX (US)

(72) Inventors: Ruiwen Zhen, Allen, TX (US); John W. Glotzbach, Allen, TX (US); Raja Bala, Pittsford, NY (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 15/898,438

(22) Filed: Feb. 17, 2018

(65) Prior Publication Data
US 2018/0352165 A1 Dec. 6, 2018

Related U.S. Application Data

(60) Provisional application No. 62/515,243, filed on Jun. 5, 2017.

(51) Int. Cl.
*H04N 5/232* (2006.01)
*H04N 5/217* (2011.01)
*H04N 5/225* (2006.01)
*H04N 5/247* (2006.01)
*G06T 5/50* (2006.01)
(Continued)

(52) U.S. Cl.
CPC ....... *H04N 5/23296* (2013.01); *G06T 3/4038* (2013.01); *G06T 5/50* (2013.01); *H04N 5/217* (2013.01); *H04N 5/2258* (2013.01); *H04N 5/23212* (2013.01); *H04N 5/23229* (2013.01); *H04N 5/247* (2013.01); *H04N 13/25* (2018.05); *H04N 13/282* (2018.05);
(Continued)

(58) Field of Classification Search
CPC .................................................... H04N 5/23296
USPC .................................................... 348/240.99
See application file for complete search history.

(56) References Cited

U.S. PATENT DOCUMENTS 6,853,808 B1    2/2005  Yasude
7,646,404 B2    1/2010  Liv
(Continued)

OTHER PUBLICATIONS

Seam-Driven Image Stitching by Junhong Gao , published May 2013.
(Continued)

*Primary Examiner* — Anthony J Daniels
(74) *Attorney, Agent, or Firm* — John J. King

(57) ABSTRACT

A method of generating an image from multiple cameras having different focal lengths is described. The method comprising receiving a wide image and a tele image; aligning the wide image and the tele image to overlap a common field of view; correcting for photometric differences between the wide image and the tele image; selecting a stitching seam for the wide image and the tele image; and joining the wide image and the tele image to generate a composite image, wherein a first portion of the composite image on one side of the stitching seam is from the wide image and a second portion of the composite image on the other side of the stitching seam is from the tele image. An electronic device for generating an image is also described.

25 Claims, 7 Drawing Sheets

(51) Int. Cl.
*H04N 13/25* (2018.01)
*G06T 3/40* (2006.01)
*H04N 13/282* (2018.01)

(52) U.S. Cl.
CPC ............. *G06T 2207/10148* (2013.01); *G06T 2207/20221* (2013.01); *H04N 5/232133* (2018.08)

(56) References Cited

U.S. PATENT DOCUMENTS

| | | | |
|---|---|---|---|
| 7,751,619 B2 | 7/2010 | Isao | |
| 7,764,309 B2 | 7/2010 | Deguchi | |
| 8,405,732 B2 | 3/2013 | Ahiska | |
| 9,019,426 B2 | 4/2015 | Han | |
| 9,061,428 B2 | 6/2015 | Brada | |
| 9,185,291 B1 | 11/2015 | Shabtay | |
| 9,462,167 B2 | 10/2016 | Lin | |
| 9,578,252 B2 | 2/2017 | Larola | |
| 9,621,803 B2 | 4/2017 | Salivar | |
| 10,051,201 B1* | 8/2018 | Wang | G02B 13/001 |
| 2011/0141226 A1 | 6/2011 | Stec | |
| 2011/0310219 A1 | 12/2011 | Kim | |
| 2012/0002897 A1* | 1/2012 | Hamada | H04N 5/272 |
| | | | 382/260 |
| 2012/0075489 A1 | 3/2012 | Nishihara | |
| 2013/0093842 A1 | 4/2013 | Yahata | |
| 2015/0085174 A1* | 3/2015 | Shabtay | H04N 5/23296 |
| | | | 348/336 |
| 2015/0138312 A1* | 5/2015 | Liu | G06T 3/4038 |
| | | | 348/36 |
| 2016/0050374 A1 | 2/2016 | Shabtay | |
| 2016/0360104 A1* | 12/2016 | Zhang | H04N 13/239 |
| 2017/0150061 A1 | 5/2017 | Sabtay | |
| 2017/0230585 A1* | 8/2017 | Nash | H04N 5/23241 |
| 2017/0330052 A1* | 11/2017 | Hiraga | G06K 9/4604 |
| 2018/0033155 A1* | 2/2018 | Jia | H04N 5/265 |
| 2018/0048825 A1* | 2/2018 | Wang | H04N 5/2258 |
| 2018/0096487 A1* | 4/2018 | Nash | H04N 5/217 |
| 2018/0211360 A1* | 7/2018 | Van Leeuwen | G06T 3/0068 |
| 2018/0253875 A1* | 9/2018 | Gorur Sheshagiri | G06T 3/0081 |

OTHER PUBLICATIONS

Tone Correction with Dynamic Objects for Seamless Image Mosaic by Yong-Ho Shin, published Sep. 2010.

Computer Vision: Algorithms and Applications by Richard Szeliski, published Sep. 30, 2010.

* cited by examiner

DEVICE HAVING CAMERAS WITH DIFFERENT FOCAL LENGTHS AND A METHOD OF IMPLEMENTING CAMERAS WITH DIFFERENT FOCAL LENGTHS

FIELD OF THE INVENTION

An embodiment of the invention relates generally to devices having multiple cameras, and in particular, to devices having cameras with different focal lengths and a method of implementing cameras with different focal lengths.

BACKGROUND OF THE INVENTION

Digital cameras are electronic devices that capture an image that is stored in a digital format. Other electronic devices, such as smart phones, tablets or other portable devices, are often equipped with a camera to enable the capture of images. As the demands for improved functionality of cameras or electronic devices having cameras has increased, multiple cameras having different functionality have been implemented in electronic devices. According to some implementations, a dual camera module in an electronic device may contain two different lenses/sensors. For example, a wide angle (wide) lens may be used with a telephoto (tele) lens to approximate the optical zoom effects. The two sensors are operated simultaneously to capture an image of the same scene, respectively referred to as a wide image and a tele image. Because the wide and tele lenses have different focal lengths, each will provide different fields of view (FOV). The wide image reflects a wider FOV, while the tele image has an FOV that may be approximately one half of the wide image for example, although the ratio of the tele image to the wide image could be some other value. While the two images are separately useful, combining portions of the two images together can be difficult.

Therefore, methods of using two images to generate a single image are beneficial.

SUMMARY OF THE INVENTION

A method of generating an image from multiple cameras having different focal lengths is described. The method comprising receiving a wide image and a tele image; aligning the wide image and the tele image to overlap a common field of view; correcting for photometric differences between the wide image and the tele image; selecting a stitching seam for the wide image and the tele image; and joining the wide image and the tele image to generate a composite image, wherein a first portion of the composite image on one side of the stitching seam is from the wide image and a second portion of the composite image on the other side of the stitching seam is from the tele image.

An electronic device is also described. The electronic device comprises a first camera having a first focal length; a second camera having a second focal length that is different than the first focal length; a processor coupled to receive images captured by the first camera and the second camera, wherein the processor: receives a wide image and a tele image; aligns the wide image and the tele image to overlap a common field of view; corrects for photometric differences between the wide image and the tele image; selects a stitching seam for the wide image and the tele image; and joins the wide image and the tele image to generate a composite image, wherein a first portion of the composite image on one side of the stitching seam is from the wide image and a second portion of the composite image on the other side of the stitching seam is from the tele image.

A non-transitory computer-readable storage medium having data stored therein representing instructions executable by a processor to perform a method comprising receiving a wide image and a tele image; aligning the wide image and the tele image to overlap a common field of view; correcting for photometric differences between the wide image and the tele image; selecting a stitching seam for the wide image and the tele image; and joining the wide image and the tele image to generate a composite image, wherein a first portion of the composite image on one side of the seam is from the wide image and a second portion of the composite image on the other side of the seam is from the tele image.

DETAILED DESCRIPTION OF THE DRAWINGS

According to different implementations for electronic devices using portions of images from multiple cameras, a technique for fusing and stitching wide and tele images captured with different settings to produce a desired zoom image (i.e. a zoom image selected by a user of the electronic device in response to a selection by a user of the electronic device or an automatic zoom operation) is described. The technique takes advantage of the FOV of the wide image and the high-quality of the tele image. If a user zooms the camera to a field of view between the wide lens and tele lens, the wide image and the tele image can be fused/stitched to produce a composite image which can provide better resolution and detail in the center part of the wide field of view, and provide the view of the scene that is out of the field of view of the tele lens as well. As the wide and tele images come from different lenses, they may pass through different image signal processors (ISPs), and are captured at slightly different viewpoints, the images may have geometric misalignment (e.g., parallax effects or optical distortion), photometric misalignment, and resolution mismatch. Therefore, the tele image is registered with the overlap region in the wide image, the photometric difference is corrected, and a desirable stitching seam is found before the two images are blended together. As will be described in more detail below, various techniques can be implemented to generate a desired zoom image having reduced visible artifacts.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Figure 1:
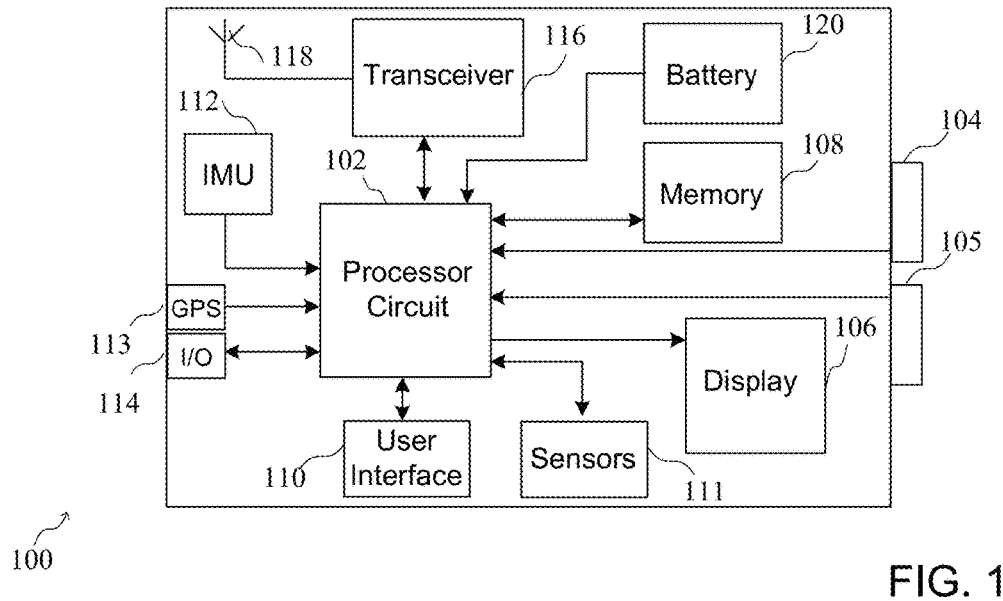
FIG. 1 is a block diagram of an exemplary electronic device having a plurality of cameras.

Turning first to FIG. 1, a block diagram of an electronic device having a plurality of cameras is shown. The exemplary electronic device 100 that may be any type of device having multiple cameras. The mobile device 100 may comprise a processor circuit 102 coupled to a plurality of cameras 104 and 105. The mobile device 100 could be any type of device adapted to transmit and receive information, such as a smart phone, tablet or other electronic device receiving or providing information, such as a wearable device. The processor circuit 102 could be an ARM processor, an X86 processor, a MIPS processor, a graphics processing unit (GPU), a general purpose GPU, or any other processor configured to execute instructions stored in a memory. The processor circuit 102 could be implemented in one or more processing devices, where the processors may be different. For example, the electronic device could include a central processing unit (CPU) as well as a GPU for example.

The processor circuit 102 may be coupled to a display 106 for displaying information to a user. The processor circuit 102 may also be coupled to a memory 108 that enables storing information related to data or information associated with achieving a goal. The memory 108 could be implemented as a part of the processor circuit 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic drive or external memory accessible by the electronic device. By providing a local memory, user preferences and other information which a user may desire to keep private is not compromised.

A user interface 110 is also provided to enable a user to both input data and receive data. Some activity tracking may require user's manual input. The user interface could include a touch screen user interface commonly used on a portable communication device, such as a smart phone, smart watch or tablet computer, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection. A user may also be able to log on to an account associated with an app that tracks a user's progress in achieving a goal.

The processor circuit 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112 can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information related to achieving a goal. The processor circuit 102 may receive input data by way of an input/output (I/O) port 114 or a transceiver 116 coupled to an antenna 118.

Figure 2:
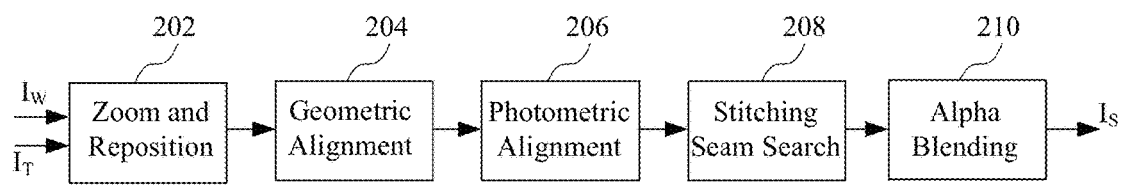
FIG. 2 is a block diagram showing processing stages for performing stitching of wide and tele images.
Figure 3:
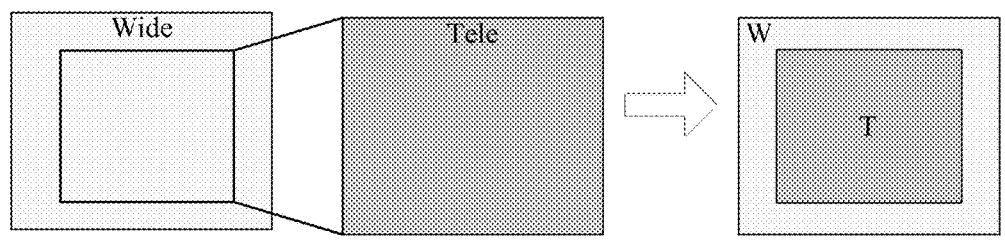
FIG. 3 is a diagram showing an example of a stitching of wide and tele images.
Figure 4:
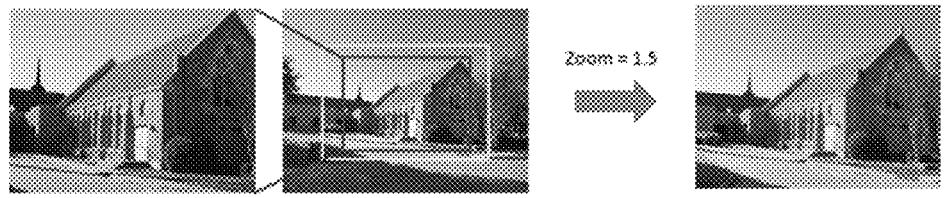
FIG. 4 is a diagram showing an example of image zooming and stitching of zoomed wide and tele images of a scene.

Turning now to FIG. 2, a block diagram shows processing stages for performing stitching of wide and zoom images to generate a composite image having the tele image placed with in the wide image. According to one implementation, the wide image and the tele image are synchronously captured to avoid distortions from moving objects. A wide image ($I_W$) and a tele image ($I_T$) are provided to a zoom and reposition block 202 that interpolates the wide ($I_W$) and tele ($I_T$) images to the zoom level requested by the user (such as by using a user interface on the device having the camera), and repositions the tele image in the center of the canvas (i.e. field of view (FOV)) covered by the wide image for rough alignment). An output of the zoom and reposition block 202 is provided to a geometric alignment block 204 that aligns the tele image with the wide image to overlap a common field of view. A photometric alignment block 206 receives an output of the geometric alignment block to correct for photometric differences between the wide image and the tele image. A stitching seam search block 208 determines an appropriate seam along which the wide and tele images are stitched together. Finally, adaptive alpha blending is performed in an alpha blending block 210 to blend wide and tele image in the vicinity of the stitching seam. In the final composite image, the central portion may be a warped tele image, where the peripheral portion is taken from the peripheral of the wide image, as illustrated in FIG. 3 and FIG. 4. That is, a first portion of the composite image on one side of the seam is from the wide image and a second portion of the composite image on the other side of the seam is from the tele image. Because the combining of the images can lead to aberrations, such as blurring, checkering, jagged edges or other imperfections that may be noticeable to viewers, the wide and tele images are joined in a way to minimize or eliminate any aberrations.

The processing stages of FIG. 2 could be performed using one or more elements of FIG. 1, such as the processor circuit 102 of FIG. 1 in combination with other elements of FIG. 1. While the various processing stages receive outputs from a previous stage and generate outputs for a following stage in FIG. 2, it should be understood that the various methods for generating an image from a plurality of images, such as a wide image, and a tele image may use fewer stages than the stages in FIG. 2, or additional stages. Further, while the stages are shown in a particular order and are performed sequentially, it should be understood that processing in some stages may be performed concurrently or in some cases different order.

Figure 5:
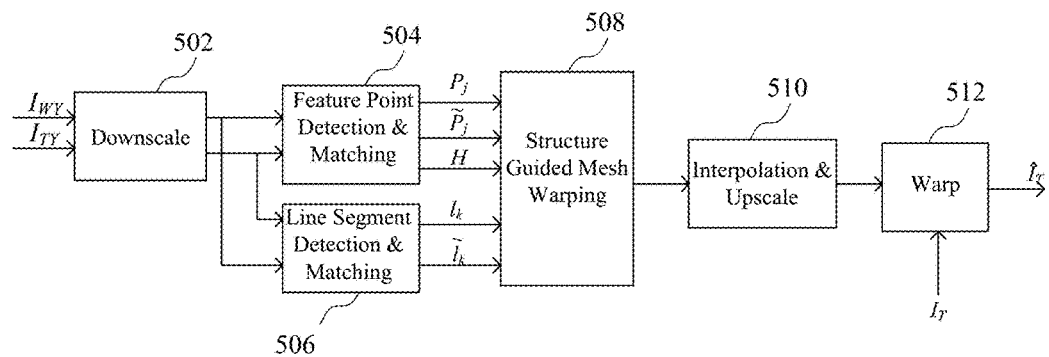
FIG. 5 is a block diagram of an exemplary geometric alignment block.

The wide and tele images need to be aligned over the overlapping or common region for stitching. A block diagram of a geometric alignment block, such as the geometric alignment block 204, is shown in FIG. 5. The geometric alignment may adopt a hybrid alignment model that combines global homography alignment and structure guided local alignment on the luminance (Y) channel of the images ($I_{WY}$, $I_{TY}$). The global alignment may fit a projective model H to the matched feature points between the wide and tele images. This global homography can preserve image structures, but may not be able to account for parallax effects or other misalignment situations (e.g., optical distortion or small motion), which can be corrected by structure guided local alignment.

A downscale block 502 is adapted to receive the wide luminance image $I_{WY}$ and the tele luminance image $I_{TY}$ at first and second inputs, where a downscaled version of the image having fewer pixels is coupled to a feature point detection and matching block 504 and a line segment detection and matching block 506. The downscale block 502 may be implemented to reduce the complexity of the data to be processed by the remaining elements of the geometric alignment block 204 by reducing the number of pixels that are processed. The feature point detection and matching block 504 enables the alignment of most regions, while the line segment detection and matching block 506 enables the alignment of particular lines or edges of objects. The output of the feature point detection and matching block includes matching feature pairs and a projective model H fitted to the matching feature points which enables global alignment. The outputs of both the feature point detection and matching block 504 and the line segment detection and matching block 506 are provided to a structure guided mesh warping (SGMW) block 508, an output of which is coupled to an interpolation and upscale block 510. A warping block 512 is configured to receive an output of the interpolation and upscale block 510 and the $I_T$ image to generate an $Î_T$ image, which is a warped tele image as will be described in more detail below.

The structure guided mesh warping (SGMW) block 508 is sequentially employed to refine the rough alignment achieved by the global homography, as shown and described in reference to FIGS. 5-8. A uniform grid may be applied on the tele image to divide it into mesh cells as described in more detail in reference to FIG. 6. The SGMW block 508 minimizes an energy function to find the mesh vertices locations of the desired local warp which can align the tele image with the wide image without generating noticeable distortion. If $V_i$ denotes the vertices of the grid mesh in the tele image and $\overline{V}_i$ denotes the vertices after global warping, the SGMW may find the unknown vertices $\hat{V}_i$ in the local-warped tele image by solving the following energy function:

$$E_{SGMW}=E_p+\lambda_1 E_g+\lambda_2 E_s+\lambda_3 E_l \quad (2)$$

which includes the data term ($E_p$), global consistency term ($E_g$), smoothness term ($E_s$), and line alignment term ($E_l$).

The data term measures the error between the feature points in the local-warped tele image and the corresponding feature points in the wide image. Let $\{(Pj, \tilde{P}j); j=1, \ldots N\}$ denote the feature point matching pairs in the tele image and wide image. With global homography (i.e. where each pixel is moved with the same transformation), the feature point $P_j$ is transformed to $\overline{P}j$, and becomes $\hat{P}_j$ after local mesh warping (i.e. moving different cells with different transformation matrices, where to matrices are local to the cell and not the whole image). As the feature point in general may not be any vertex of the mesh, a bilinear interpolation of the four vertices of the mesh cell containing the feature point will be used to represent this feature point. More specifically, for each feature point $\overline{P}j$, the four linear combination coefficients $\{\alpha_{j,m}, m=1; 2; 3; 4\}$ for vertices $\{\nabla_{j;m}; m=1; 2; 3; 4\}$ of a cell are determined using an inverse bilinear interpolation method. These coefficients are used to combine the target vertices $\hat{V}_{j,m}$ to generate the final feature point locations $\hat{P}_j$. Therefore, the data term is defined as:

$$EP=\Sigma_{j=1}^{N}\|\Sigma_{m=1}^{4}\alpha_{j,m}\hat{V}_{j,m}-\tilde{P}_{j}\|^2 \quad (3)$$

where N is the number of matching feature pairs.

For image regions without matched feature points, minimizing the data term only may distort them. Therefore, the global consistency term imposes a constraint that the local-warped image regions should be consistent with the global-warped result when there are no matching pairs in the neighborhood of these regions. Specifically, the global consistency term $E_g$ encourages target vertices $\hat{V}_i$ to be the same as the global-warped vertices $\overline{V}_i$ of the mesh cells which have no matching feature pairs, $$E_g=\Sigma_i W_i\|\hat{V}i-\overline{V}i\|^2 \quad (4)$$

where $W_i=1$ indicates $V_i$ has feature points in the neighborhood; otherwise, $W_i=0$.

Figure 6:
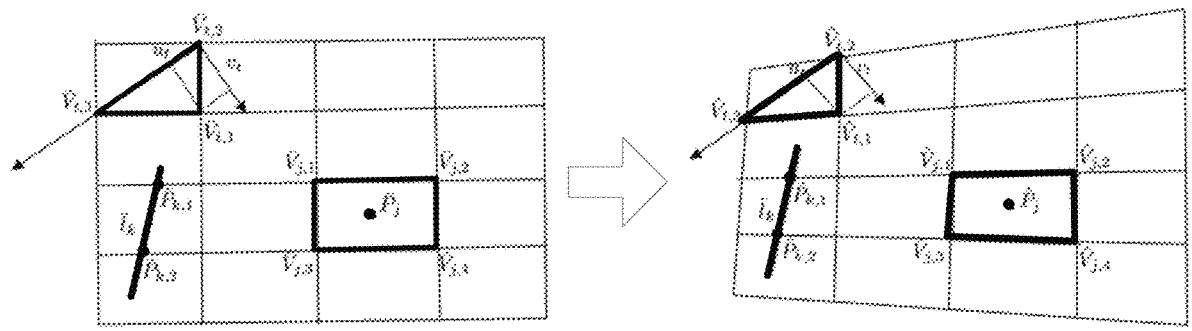
FIG. 6 is a diagram showing structure guided mesh warping.

The smoothness term encourages the mesh cells to undergo a similarity transformation to preserve object shape and image structures as much as possible during local warping. This constraint is applied on the triangles formed from mesh vertices. Consider a triplet $\Delta \overline{V}_{t,1} \overline{V}_{t,2} \overline{V}_{t,3}$ which defines a triangle with vertices $\Delta V_{t,1} \overline{V}_{t,2} \hat{V}_{t,3} \in \{\overline{V}_j\}$ as shown in FIG. 6, the vertex $\overline{V}_t$, 1 can be represented by $\overline{V}_t$, 2 and $\overline{V}_t$, 3 via $$\overline{V}_{t,1}=\overline{V}_{t,2}+u_t(\overline{V}_{t,3}-\overline{V}_{t,2})+v_t R(\overline{V}_{t,3}-\overline{V}_{t,2}) \quad (5)$$

where R rotates the vector 90 degrees, $$R = \begin{bmatrix} 0 & 1 \\ -1 & 0 \end{bmatrix}. \quad (6)$$

The values $u_t$ and $v_t$ encode the relative relationship of the three vertices and remain the same under a similarity transformation. Therefore, the smoothness term is formulated as follows:

$$E_s=\Sigma_{t=1}^{T}M_t\|\hat{V}_{t,1}-(\hat{V}_{t,2}+u_t(\hat{V}_{t,3}-\hat{V}_{t,2})+v_t R(\overline{V}_{t,3}-\overline{V}_{t,2}))\|^2 \quad (7)$$

where T is the number of triangles used. By way of example, four triangles may be built for each vertex. The saliency map $M_t$ is computed by the color variance in each mesh cell, which promotes shape invariance more in salient regions than in non-salient regions.

Figure 7:
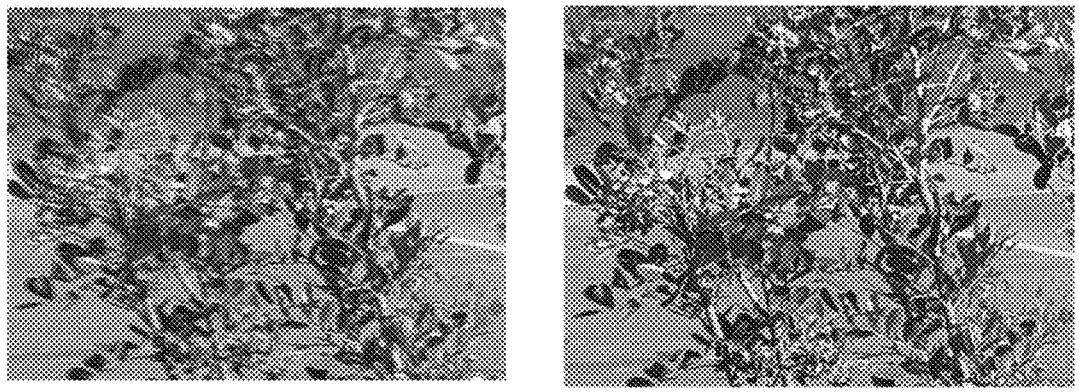
FIG. 7 is a diagram showing the performance of structure guided mesh warping.

A performance of structure guided mesh warping with the above defined terms is shown in FIG. 7. Overlaying a global-warped tele image and wide image is shown on the left, and overlaying a local-warped tele image and wide image is shown on the right.

The above terms are used to ensure good alignment in image regions with feature points while avoiding severe local distortion. However, line discontinuity may occur if a line crosses the stitching boundary where there is no sufficient matching pairs. Human eyes are very susceptible to these broken lines. Therefore, a line alignment term is incorporated to ensure that the corresponding line segments are well aligned. Let $(l_k, \tilde{l}_k, k=1, \ldots K)$ denote the line segment pairs of the tele and wide images in the vicinity of the stitching boundary. The line alignment term requires that the sum of distances from the points $P_{k,s}$ on the line $l_k$ of the tele image to the corresponding line $\tilde{l}_k$ of the wide image is the minimum. The points $P_{k,s}$ are intersections when line segment $l_k$ goes across the mesh, and similarly their global-warped results $\overline{P}_{k,s}$ can be represented as a bilinear combination of the four vertices encompassing it. If the line correspondences can be perfectly aligned, then $$\tilde{l}_k * (\Sigma_{m=1}^4 \alpha_{k,s,m} \hat{V}_{k,s,m}) = 0 \qquad (8)$$

The line alignment term is the accumulation of Eq (8) for all matching line segments, $$E_l = \sum_{k=1}^K \sum_s \left\| \tilde{l}_k * \left( \sum_{m=1}^4 \alpha_{k,s,m} \hat{V}_{k,s,m} \right) / \sqrt{\tilde{a}_k^2 + \tilde{b}_k^2} \right\|^2 \qquad (9)$$

where $\tilde{l}_k = [\tilde{a}_k, \tilde{b}_k, \tilde{c}_k]$, $\tilde{a}_k, \tilde{b}_k, \tilde{c}_k$ are coefficients for line equation $\tilde{a}_k x + \tilde{b}_k y + \tilde{c}_k = 0$ and the normalizer $\sqrt{\tilde{a}_k^2 + \tilde{b}_k^2}$ is used to make sure each line segment contributes equally. Having defined all the energy terms, we can minimize the energy function with a sparse linear solver as it is quadratic. The parameters $\lambda_1, \lambda_2, \lambda_3$ regularize the weight of each term. Once the unknown vertices $\hat{V}_i$ are obtained, the displacements between $V_i$ and $\hat{V}_i$ can be interpolated to warp the whole tele image.

Figure 8:
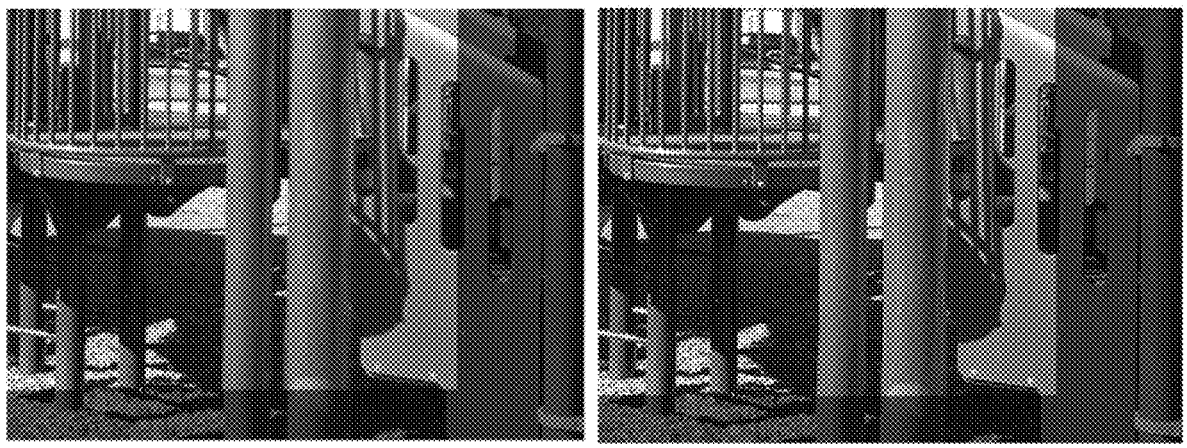
FIG. 8 is a diagram showing the performance of structure guided mesh warping without a line alignment term and with a line alignment term.

The images in FIG. 8, show structure guided mesh warping without a line alignment term on the left and with a line alignment term on the right.

Figure 9:
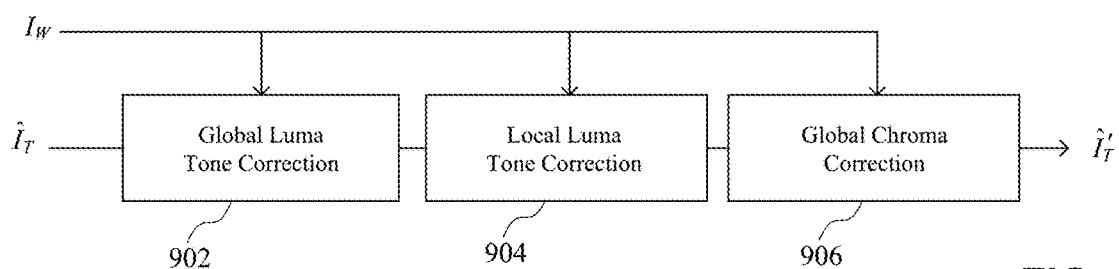
FIG. 9 is a block diagram of an exemplary photometric alignment block.

Turning now to FIG. 9, a block diagram of photometric alignment block is shown. The photometric alignment block comprises a global luminance (luma) tone correction block 902 which is configured to receive the $\hat{I}_T$, a local luma tone correction block 904 and a global chroma correction block 906. Each of the global luma tone correction block 902, the local luma tone correction block 904, and a global chroma correction block 906 are adapted to receive the $I_W$ signal. The global chroma correction block 906 generates an output $\hat{I}'_T$ signal, which is photometrically aligned.

Figure 10:
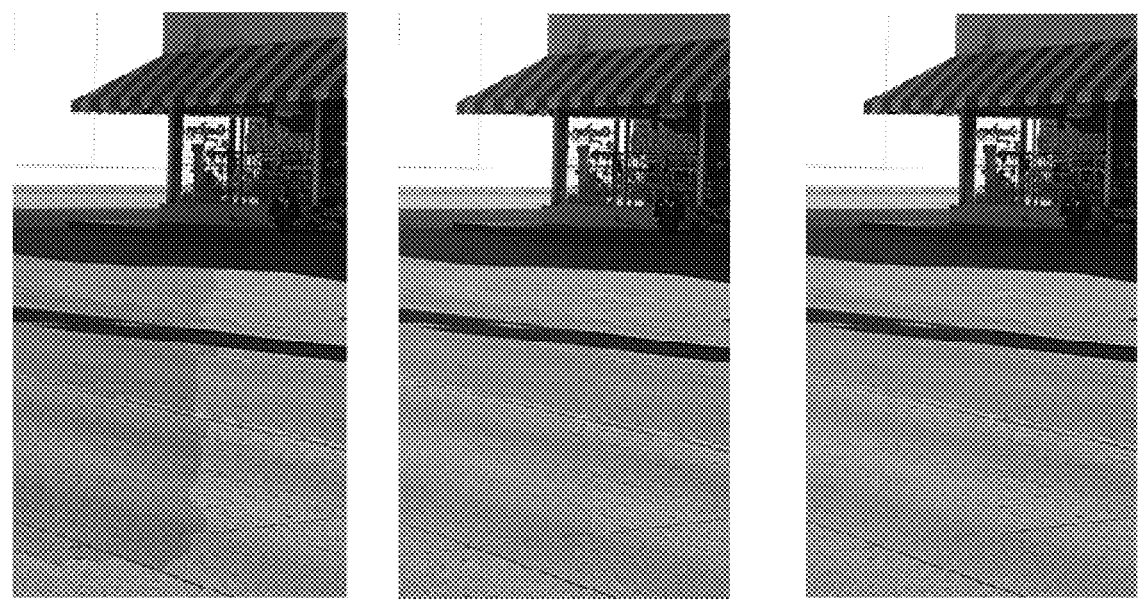
FIG. 10 is a diagram showing the performance of a photometric alignment block.

The wide and tele images are captured by different cameras using potentially different capture settings and may undergo different image processing operations. This may produce visible differences in luminance and chrominance reproduction between the two images. The photometric alignment block 206 corrects for such differences separately in luminance and chrominance channels. The luminance correction is done in two stages: a global correction to account for global luminance mismatch between the wide and tele images, followed by local correction to account for spatially varying luminance mismatches across the two images. In the first stage (i.e. the global luma tone correction block 902), a histogram matching technique may be used to match the global luminance profile of the tele image to that of the wide image. In the second stage (i.e. the local luma tone correction block 904), a spatially-varying gamma correction may be applied by taking the ratios of logs of downsampled averaged versions of the wide and tele image in a blockwise fashion. A series of images in FIG. 10 shows the performance of a photometric alignment block, and more particularly the performance of the photometric alignment block without photometric alignment in the first image, after global luma correction in the second image, and after local luma and global chroma correction in the third image.

A first beneficial aspect of the photometric alignment block is in the global luma tone correction block. Since the human eye is most likely to discern a photometric mismatch in smooth regions of the image, the images may be first processed through a spatial frequency filter, and the histograms are computed from filtered results which are mostly smoothly-varying regions. According to one implementation of the special filter, a low pass filter such as an averaging or Gaussian filter is applied to the image and subtracted from the original image. The difference image represents high frequency components in the image. This difference is compared to a threshold, and only regions below the threshold (i.e. regions with little high frequency content) are considered in the histogram computation. A second beneficial aspect of the photometric alignment block lies in the fact that in both the global and local corrections, greater emphasis is placed on matching pixels in the vicinity of the stitching boundary between the wide and tele images. In the global stage, pixels near the boundary are given greater weight in the histogram calculation. In the local luma tone correction stage, gamma correction may be applied preferentially in the vicinity of the boundary, rather than within the entire tele image.

Figure 11:
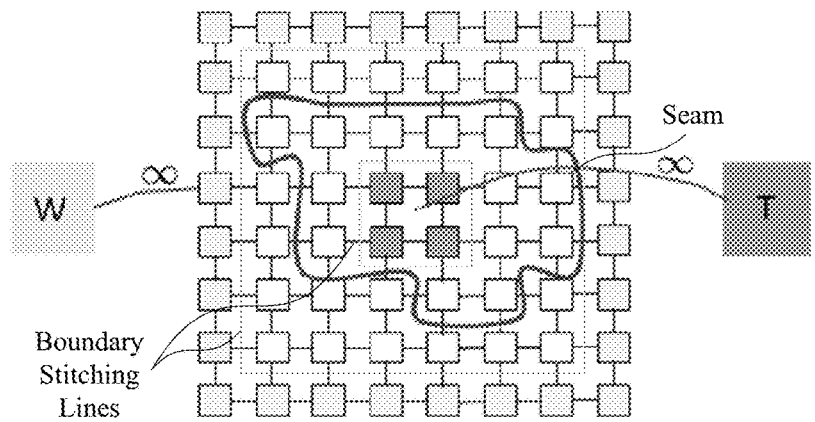
FIG. 11 is a diagram showing a seam searching process.

In general, it is difficult to perfectly align the tele image with the overlap region in the wide image, so a seam finding method is developed in stitching seam search block 208 to search a seam for optimal stitching in a way that the tele and wide images can be well stitched in local areas along the seam. According to one embodiment, the search for a seam can be cast into a graph cut problem. A constructed graph is shown in FIG. 11 with overlapping pixel locations as the nodes and W/T as the labels (where in graph cut problem, it is called sink and source respectively). The overlapping region is limited to a wide margin close to the stitching boundary. There are several principles that further constrain the space where the seam can be searched. For example, if a human face exists in this region, we should not consider these pixels as search candidates to avoid seam cutting through the face.

Figure 12:
FIG. 12 is an image showing a searching for a seam in an overlapping region for good stitching.

In the graph, all of the pixels surrounding this margin are constrained to come from either the tele image or the wide image, indicating infinite edge weights from these pixels to its closest label. The edge weight between two graph nodes in the overlapping region is designed to encourage the seam going through texture regions rather than smooth regions and large-scale edges, $$E(t;s) = \frac{(|I_W(s) - I_T(s)| - |I_W(t) - I_T(t)|)}{(|G_W^d(s)| + |G_W^d(t)| + |G_T^d(s)| + |G_T^d(t)|)} \qquad (9)$$

where s and t are adjacent pixels, $G_W^d$ and $G_T^d$, are the texture maps in the wide and tele image along the direction d (d depends on the spatial relationship of s and t). This edge weight penalizes less on texture regions. The max-flow cut is used to seek the minimum cost cut of the graph that separates the overlapping regions into different labels, which avoid traversing across objects of recognizable visual importance; to avoid traversing across boundaries of geometrically misaligned objects; and to avoid traversing across of boundaries that could not be photometrically aligned. FIG. 12 shows how the resulting seam avoids large misalignment regions to achieve better stitching.

Blending as a post-processing step aims to make the transition from one image to another more natural and smooth to achieve edge and texture homogeneity in the presence of color and resolution differences. As will be described in more detail below, the blending process can blend the pixels on both sides of the seam adaptively so that a wide transition band is used for smooth regions and texture regions while a narrow band or even no blending is used for edges to avoid visible ghosting artifacts.

Figure 13:
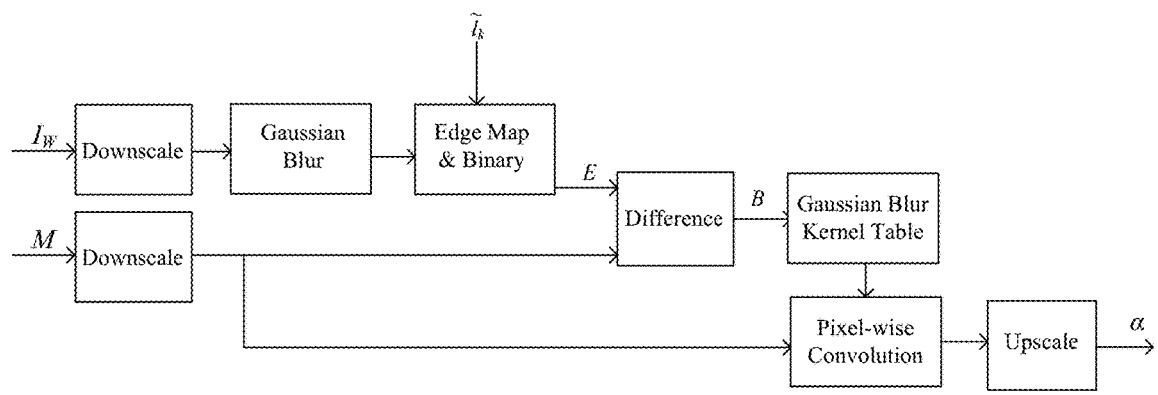
FIG. 13 is a block diagram of an exemplary block for performing adaptive blending.

Turning now to FIG. 13, a block diagram of a block for performing adaptive blending is shown. A mask M is generated in the stitching seam search block, where the pixels belonging to the tele image is labeled by M=1. A blur map coupled with a Gaussian blur kernel table for example is designed to achieve adaptive blending. The values of the blur map indicate which Gaussian blur kernel will be picked from the table for pixel-wise convolution with the mask M. The higher the blur map value is, the larger is the size of the selected Gaussian blur kernel. First, an edge map is computed by taking gradients of the blurred wide image $I_W$ as:

$$E=\Sigma_k G_k \oplus (I_w \oplus G_g) \quad (10)$$

where $G_g$ is a fixed-size Gaussian blur kernel to mask out the texture regions whose scale is below the size of the kernel, and $G_k$ denotes a set of filters to approximate first-order derivatives in two directions. In order to ensure no blending on salient edges, the edge map is binarized with a threshold T, where $$E=0.5 \text{ if } \tilde{I}_k \text{ is there; } E=1.0 \text{ if } E>T; \text{ or } E=0.0 \text{ otherwise} \quad (11)$$

The purpose of the first case (i.e. where E=0.5) is to blend a little more on regions of line segments to distribute the pixel-level errors in stitching two line segments to the neighborhood. The final blur map B is yielded by subtracting the edge map E from the mask M, $$B=M-E \quad (12)$$

By performing a spatial-variant convolution, the adaptive alpha map for blending can be represented by, $$\alpha(x)=M \oplus_x G_{g,B(x)} \quad (13)$$

where x denotes the pixel location and $G_{g,B(x)}$ is a Gaussian blur kernel with a size proportional to B(x). Then the stitching result is $$I_S=\alpha*I_T+(1-\alpha)*I_W \quad (14)$$

where the multiplication symbol * indicates a pixel-wise multiplication.

Figure 14:
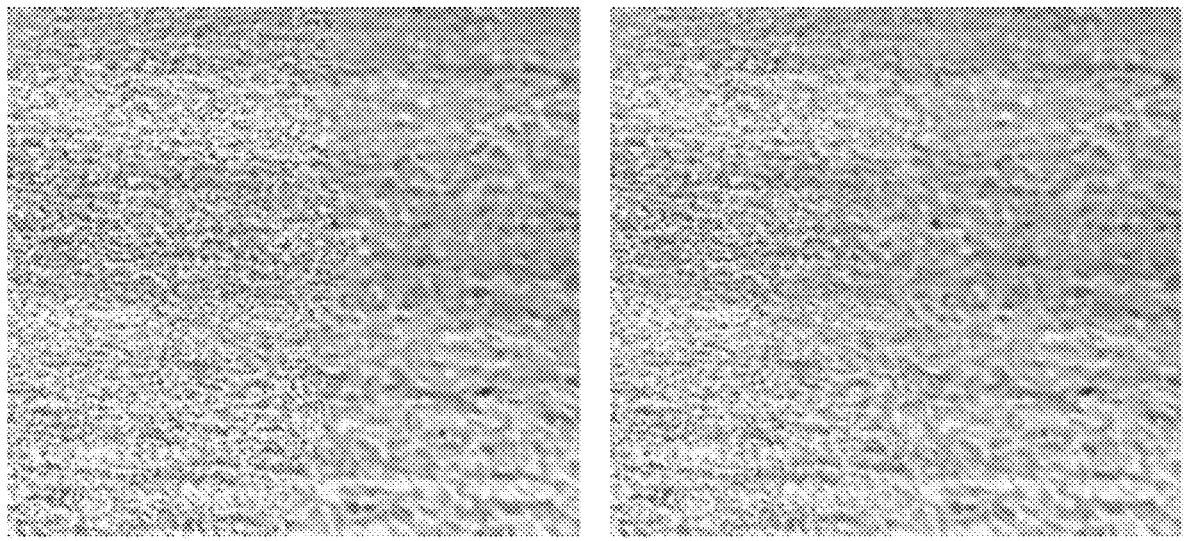
FIG. 14 shows images comparing pyramid blending and adaptive alpha blending.
Figure 15:
FIG. 15 shows images comparing alpha blending and adaptive alpha blending.
Figure 15:

The purpose of blurring wide image first is to mask out the texture regions whose scale is below the size of the blur kernel and finally to increase blending on those texture regions. In order to avoid no blending on salient edges, the edge map is binarized with a threshold. In addition, the edge map on regions of detected line segmentations is set to a lower value for more blending so as to distribute the pixel-level errors in stitching two line segments to the neighborhood. The final blur map is yielded by subtracting the edge map from the mask. By performing a spatial-variant convolution, the adaptive alpha map is obtained for blending the warped tele image and wide image. FIG. 14 compares the performance of the proposed adaptive alpha blending with that of the pyramid blending which is widely used in image stitching problems. As can be seen, the blending map produces a more natural transition on texture regions. Another comparison is conducted between blending process according to FIG. 13 and alpha blending, as shown in FIG. 15. The ghost artifacts are successfully suppressed by the novel blending map.

Figure 16:
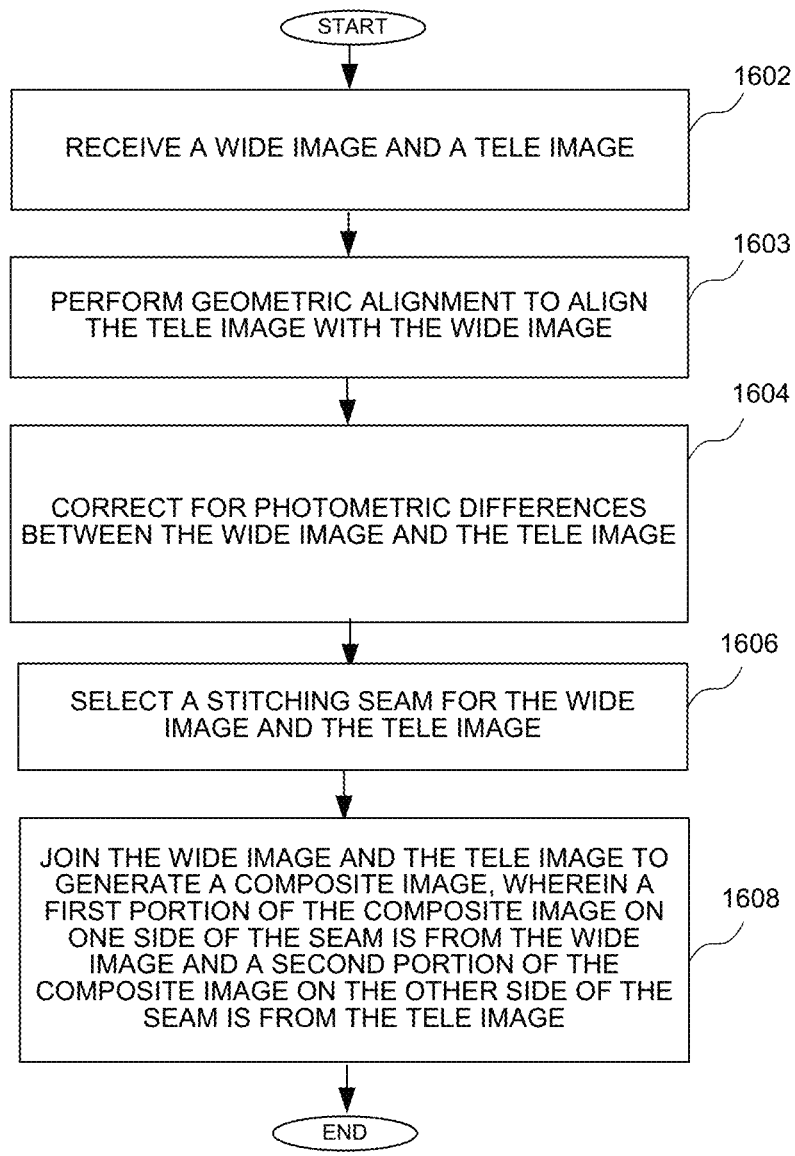
FIG. 16 is a flow diagram showing a method of implementing cameras with different focal lengths.

Turning now to FIG. 16, a flow diagram shows a method of implementing cameras with different focal lengths. The method may be implemented using any of the embodiments of FIGS. 1-15 as described, or other suitable embodiments. A wide image and a tele image are received at a block 1602. Geometric alignment is performed to align the tele image with the wide image at a block 1603. Photometric differences between the wide image and the tele image are corrected at a block 1604. A stitching seam for the wide image and the tele image is selected at a block 1606. The wide image and the tele image are joined to generate a composite image at a block 1608, wherein a first portion of the composite image on one side of the seam is from the wide image and a second portion of the composite image on the other side of the seam is from the tele image.

The method may further comprises providing a geometric alignment of the wide image and the tele image using an alignment term to align corresponding line segments of the wide image and the tele image. Providing a geometric alignment may comprise establishing a global consistency term to make local warping consistent with global warping in regions where there are no matching feature points. Correcting for photometric differences may comprise providing global luminance correction using smooth regions only, and providing photometric alignment by matching pixels in the vicinity of a stitching boundary between the wide and tele images. Blending the wide image and the tele image may comprise providing adaptive alpha blending, and more particularly performing a spatial-variant convolution to obtain an adaptive alpha map.

While specific elements of the method are described, it should be understood that additional elements of the method, or additional details related to the elements, could be implemented according to the disclosure of FIGS. 1-15.

It can therefore be appreciated that new circuits for and methods of implementing a device having cameras with focal lengths has been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of generating an image from multiple cameras having different focal lengths, the method comprising:
   receiving a wide image and a tele image;
   aligning the wide image and the tele image to overlap a common field of view;
   establishing a stitching boundary associated with an overlapping region of the wide image and the tele image;
   correcting, after establishing the stitching boundary, for photometric differences between the wide image and the tele image, wherein correcting for photometric differences comprises performing global luminance tone correction and local luminance tone correction in the stitching boundary;
   selecting, after aligning the wide image and the tele image and correcting for photometric differences between the wide image and the tele image, a stitching seam for the wide image and the tele image; and
   joining the wide image and the tele image to generate a composite image, wherein a first portion of the composite image on one side of the stitching seam is from the wide image and a second portion of the composite image on the other side of the stitching seam is from the tele image.

2. The method of claim 1 wherein aligning the wide image and the tele image comprises providing a geometric alignment of the wide image and the tele image using an alignment term to align image regions containing:
matching feature points; or
matching line segments.

3. The method of claim 2 wherein aligning the wide image and the tele image comprises establishing a global consistency term to make local warping consistent with global warping in regions containing no matching feature points and no matching line segments.

4. The method of claim 1 wherein correcting for photometric differences comprises providing global luminance or global chrominance correction using smooth image regions.

5. The method of claim 1 wherein correcting for photometric differences comprises providing photometric alignment by matching pixels in the vicinity of the stitching boundary between the wide image and the tele image.

6. The method of claim 1 wherein selecting a stitching seam comprises selecting a predetermined subset of the common field of view for searching for the stitching seam.

7. The method of claim 1 wherein selecting a stitching seam comprises selecting a stitching seam to reduce aberrations in the composite image by at least one of:
avoiding traversing across large-scale edges;
avoiding traversing smooth regions; traversing across textured regions;
avoiding traversing across objects of recognizable visual importance;
avoiding traversing across boundaries of geometrically misaligned objects; and
avoiding traversing across boundaries that could not be photometrically aligned.

8. The method of claim 1 wherein joining the wide image and the tele image comprises providing adaptive alpha blending.

9. The method of claim 1 wherein joining the wide image and the tele image comprises performing a spatial-variant convolution to obtain an adaptive alpha map.

10. The method of claim 1 further comprising synchronously capturing the wide image and the tele image to avoid distortions from moving objects.

11. The method of claim 1, further comprising performing histogram matching including matching a global luminance profile of the tele image to a global luminance profile of the wide image, wherein performing global luminance tone correction comprises placing greater weight in the stitching boundary.

12. The method of claim 1, further comprising performing, after performing global luminance tone correction and local luminance tone correction in the stitching boundary, global chrominance correction in the stitching boundary.

13. An electronic device, comprising:
a first camera having a first focal length;
a second camera having a second focal length that is different than the first focal length;
a processor coupled to receive images captured by the first camera and the second camera, wherein the processor:
receives a wide image and a tele image;
aligns the wide image and the tele image to overlap a common field of view;
establishes a stitching boundary associated with an overlapping region of the wide image and the tele image;
corrects, after establishing the stitching boundary, for photometric differences between the wide image and the tele image, wherein correcting for photometric differences comprises performing global luminance tone correction and local luminance tone correction in the stitching boundary;
selects, after aligning the wide image and the tele image and correcting for photometric differences between the wide image and the tele image, a stitching seam for the wide image and the tele image; and
joins the wide image and the tele image to generate a composite image, wherein a first portion of the composite image on one side of the stitching seam is from the wide image and a second portion of the composite image on the other side of the stitching seam is from the tele image.

14. The electronic device of claim 13 wherein aligning the wide image and the tele image comprises providing a geometric alignment of the wide image and the tele image using an alignment term to align image regions containing:
matching feature points; or
matching line segments.

15. The electronic device of claim 14 wherein aligning the wide image and the tele image comprises establishing a global consistency term to make local warping consistent with global warping in regions containing no matching feature points and no matching line segments.

16. The electronic device of claim 13, wherein selecting a stitching seam comprises selecting a stitching seam to reduce aberrations in the composite image by at least one of:
avoiding traversing across large scale edges;
avoiding traversing smooth regions; traversing across textured regions;
avoiding traversing across objects of recognizable visual importance;
avoiding traversing across boundaries of misaligned objects; and
avoiding traversing across boundaries that could not be photometrically aligned.

17. The electronic device of claim 13, wherein joining the wide image and the tele image comprises providing adaptive alpha blending.

18. The electronic device of claim 13, wherein the processor further performs histogram matching including matching a global luminance profile of the tele image to a global luminance profile of the wide image, wherein performing global luminance tone correction comprises placing greater weight in the stitching boundary.

19. The electronic device of claim 13, wherein the processor further performs, after performing global luminance tone correction and local luminance tone correction in the stitching boundary, global chrominance correction in the stitching boundary.

20. A non-transitory computer-readable storage medium having data stored therein representing instructions executable by a processor to perform a method comprising:
receiving a wide image and a tele image;
aligning the wide image and the tele image to overlap a common field of view;
establishing a stitching boundary associated with an overlapping region of the wide image and the tele image;
correcting, after establishing the stitching boundary, for photometric differences between the wide image and the tele image, wherein correcting for photometric differences comprises performing global luminance tone correction and local luminance tone correction in the stitching boundary;

selecting, after aligning the wide image and the tele image and correcting for photometric differences between the wide image and the tele image, a stitching seam for the wide image and the tele image; and joining the wide image and the tele image to generate a composite image, wherein a first portion of the composite image on one side of the stitching seam is from the wide image and a second portion of the composite image on the other side of the stitching seam is from the tele image.

21. The non-transitory computer-readable storage medium of claim 20 wherein aligning the wide image and the tele image comprises providing a geometric alignment of the wide image and the tele image using an alignment term to align image regions containing:

matching feature points; or matching line segments.

22. The non-transitory computer-readable storage medium of claim 21 wherein geometrically aligning the wide image and the tele image comprises establishing a global consistency term to make local warping consistent with global warping in regions containing no matching feature points and no matching line segments.

23. The non-transitory computer-readable storage medium of claim 20, wherein selecting a stitching seam comprises selecting a stitching seam to reduce aberrations in the composite image by at least one of:

avoiding traversing across large scale edges;

avoiding traversing smooth regions; traversing across textured regions;

avoiding traversing across objects of recognizable visual importance;

avoiding traversing across boundaries of misaligned objects; and avoiding traversing across boundaries that could not be photometrically aligned.

24. The non-transitory computer-readable storage medium of claim 20, further comprising performing histogram matching including matching a global luminance profile of the tele image to a global luminance profile of the wide image, wherein performing global luminance tone correction comprises placing greater weight in the stitching boundary.

25. The non-transitory computer-readable storage medium of claim 20, further comprising performing, after performing global luminance tone correction and local luminance tone correction in the stitching boundary, global chrominance correction in the stitching boundary.

* * * * *